June 13, 1961 R. TAYNTON 2,987,729
STAPLING DEVICE
Filed Feb. 10, 1959 2 Sheets-Sheet 1
FIG. 1
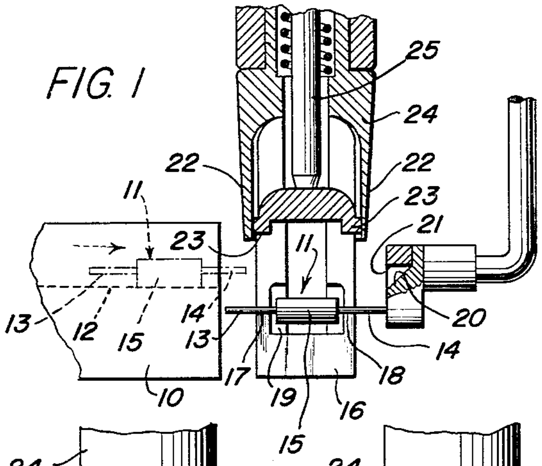
FIG. 2
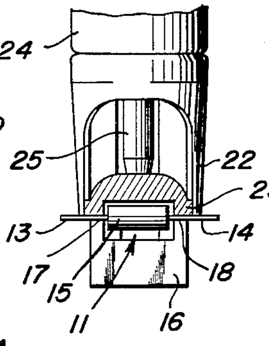
FIG. 3
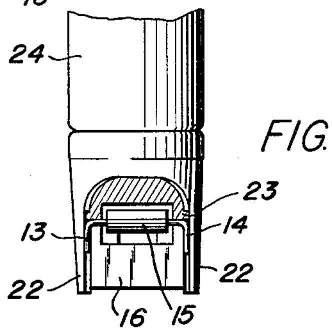
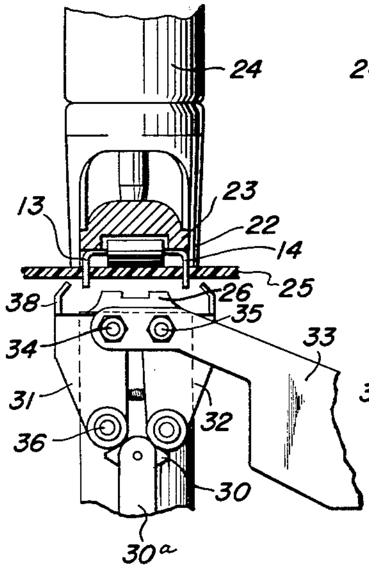
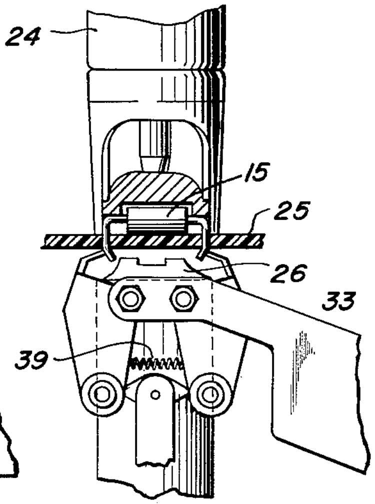
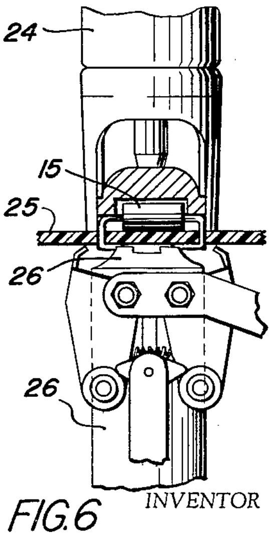
FIG. 4 FIG. 5 FIG. 6
INVENTOR
RALPH TAYNTON
BY Hurvitz & Rose
N. Robert Baylor
ATTORNEYS June 13, 1961 R. TAYNTON 2,987,729

STAPLING DEVICE

Filed Feb. 10, 1959 2 Sheets-Sheet 2

INVENTOR
RALPH TAYNTON
BY Hurvitz & Rose
W. Robert Baylor
ATTORNEYS

United States Patent Office 2,987,729

Patented June 13, 1961

2,987,729

STAPLING DEVICE

Ralph Taynton, Fairfax, Va., assignor to Melpar, Inc., Falls Church, Va., a corporation of New York Filed Feb. 10, 1959, Ser. No. 792,385

3 Claims. (Cl. 1—220)

The present application is for an improvement in automatic electronic sub-assembly fabricating machines such as are disclosed in an application for U.S. Patent filed in the name of Herbert K. Hazel on June 7, 1955, identified as Serial No. 577,329, now Patent No. 2,947,447, dated August 2, 1960, and entitled, Component Feed and Insertion, and assigned to the same assignee as the present application, and more particularly to stapling machines having provision for pre-bending leads of electrical components prior to clinching and soldering them to printed circuit foils.

Previously to the present invention, and particularly in the above identified application, the procedure for component insertion involved clamping the component while its leads were bent to an angle of 90° downwardly with respect to the axis of the component. The component was then held by its bent leads until the leads were inserted through holes in a printed circuit board, after which the leads were released. A clinching anvil was then raised towards the circuit board to clinch the leads to the board. The anvil contained rolling recesses of the type generally employed in desk staplers, which roll up the ends of the leads inwardly. It has been found, in practice, that when the components have stiff leads the latter tend to spring outwardly, to a sufficient degree that they are not caught by the rolling recesses, whereupon an imperfect stapling action results.

According to the present invention, the lead ends, as they protrude through the circuit board, are pre-bent inwardly just before the rolling recesses take hold, to assure that the lead ends will fall within the rolling recesses.

The structure employed, briefly described, involves a pair of hinged fingers, which are cammed inwardly by a cam secured to the clinching anvil to pre-bend the lead ends, and which thereafter move outwardly to clear the anvil before the anvil completes its clinching operation.

It is, accordingly, a broad object of the present invention to provide a system for pre-bending the leads of electrical components while clinching some to a panel board.

The above and still further objects, features, and advantages of the present invention will become apparent upon consideration of the following detailed description of one specific embodiment thereof, especially when taken in conjunction with the accompanying drawings, wherein:

FIGURE 1 is a front elevational view, partly in section, of a lead former head, and a former block;

FIGURES 2 and 3 show in front elevation sequential positions of the former head of FIGURE 1;

Figure 7:
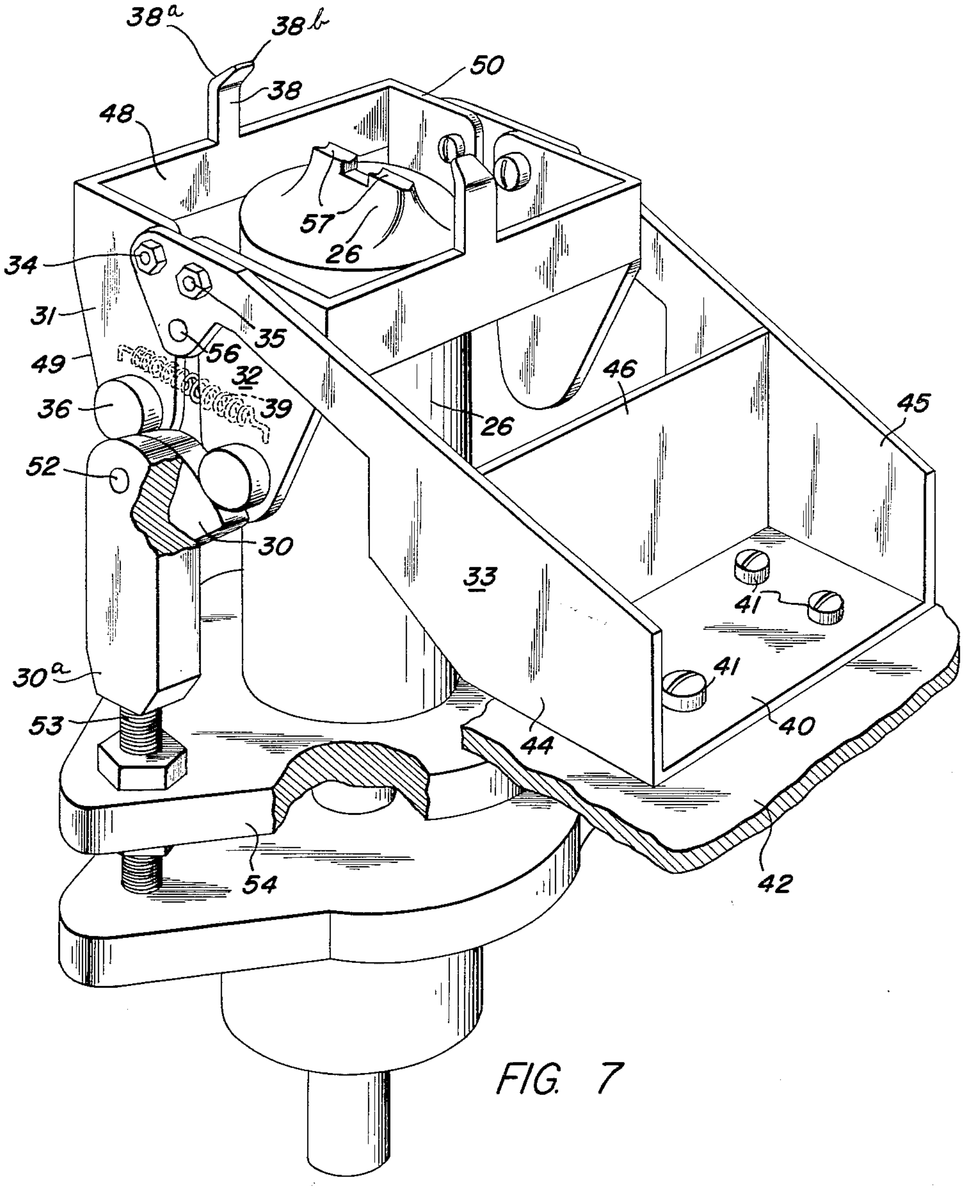

FIGURES 4, 5, and 6 show in front elevation further sequential positions of the former head of FIGURES 1–3, together with sequential positions of a lead prebender and an anvil; and FIGURE 7 is a view in perspective of structural features of the device of FIGURES 1–6, inclusive.

Referring now more particularly to the accompanying drawings, the reference numeral 10 denotes an air chute, which feeds components 11 from left to right, as seen in FIGURE 1, by air flow suitably directed along the bottom edge 12 of a horizontal channel formed in the chute 10. The component 11 is illustrated, for the sake of example, as a resistor, having oppositely extending leads 13, 14 secured axially to a cylindrical body 15.

The inertia of the component 11 serves to carry it from the chute 10, over and above a forming block 16. The latter includes two lead supporting shoulders 17, 18, and a recess 19 within which the body 15 may lie without contacting the forming block 16. The force with which the component 11 is ejected from the chute 10 is sufficiently great to impel the forward lead 14 against a camming surface 20, the component 11 being cammed into horizontal attitude by the camming surface 20, which tends to raise the forward lead 14 as the rearward lead 13 leaves the chute 10. After the forward lead 14 is forced into contact with the stop 21, which terminates upward motion of the forward lead 14, the entire component 11 falls by gravity until the leads 13 and 14 lie, respectively, on the shoulders 17 and 18 and the body 15 within the recess 19.

At this point, forming fingers 22 and holding fingers 23 descend together, being impelled by suitable pneumatically driven rods 24 and 25, respectively. FIGURE 2 illustrates the positions of forming fingers 22 and holding fingers 23 when the latter contact leads 13, 14 and press the latter against supporting shoulders 17 and 18. The holding fingers 23 terminate their movement at this point in a cycle of operations, but the forming fingers 22 continue downward, forming the leads 13, 14 by bending same downwardly at 90° over the forming block 16. The forming block 16 is then removed, by mechanism not illustrated, and holding fingers 23 force the bent leads 13, 14 downwardly with respect to forming fingers 22, while the latter also move downwardly, causing the ends of leads 13, 14 to pass through suitably positioned apertures in a panel board 25. The holding fingers 23 and the forming fingers 22 then maintain their positions during a clinching operation.

In the machine as described in the above referred to application for U.S. patent, a clinching anvil 26 was raised, at the last point in a cycle of operations, to clinch the ends of leads 13, 14 against the bottom of panel board 25. It has been found, however, that there exists a tendency for some component leads, especially those which are particularly stiff or resilient, to spring outwardly after having passed through circuit board 25, which prevents correct clinching.

In accordance with the present invention, a cam 30 is carried by a post 30*a* secured immovably to the clinching anvil 26, for vertical movement therewith. The cam 30 is preferably of diamond shape, with the long diagonal extending horizontally.

A pair of hinged brackets 31, 32 are pivotally mounted on a support 33, the pivot points 34, 35 being horizontally separated. The hinged brackets 31, 32 are mirror images, the one of the other, so that description of one will suffice.

The bracket 31 includes, pivotally mounted adjacent its lower end, a cylindrical rolling cam follower 36 which is forced outwardly as cam 30 moves upwardly. A lead presser finger 38 is secured adjacent the upper end of bracket 31, and moves in the arc of a circle inwardly and upwardly as cam follower 30 moves outwardly, until it presses against lead 13, and bends same inwardly (FIGURE 5). As the clinching anvil 26 continues its upward motion the cam 30 passes beyond the cam follower 36, permitting the latter to move inwardly on the lower side of cam 30 (FIGURE 6) in response to tension of a spring 39, whereupon the finger 38 moves downwardly and outwardly, providing clearance for clinching anvil 26.

On retrograde movement of clinching anvil 26, cam 30 is withdrawn below cam follower 36, preparatory to a further operation.

In a practical embodiment of the system of FIGURES 1–6, illustrated in FIGURE 7 of the accompanying drawings, the support 33 is a two armed bracket having a horizontal base plate 40, bolted as by bolts 41 to a supporting structure generally indicated at 42.

Arms 44, 45, subsisting in parallel vertical planes, extend from the base plate 40, and are braced by a transverse plate 46 extending therebetween. The arms 44, 45 at their remote ends support the pivots 34, 35.

Bracket 31 generally is of U-shape, including a transverse base 48 extending in a vertical plane parallel to the plate 46, and, extending from plate 48 at right angles thereto, a pair of parallel plates 49, 50 subsisting in vertical planes perpendicular to the plane of the transverse base 48. The forward and upward corner of plate 49 extends to the pivot 34, on which it is pivoted. Plate 49 extends downwardly to a point adjacent an upper surface of cam 30, where cam follower 36 is secured rotatably to the plate 49 and in rolling contact with the upper surface of cam 30.

Cam 30 is secured adjacent the upper end of post **30*a* by means of a pin 52. The post 30*a* at its lower end is threadedly engaged with a stud 53. The latter extends through a supporting collar 54 secured immovably to the clinching anvil 26 and extending about the latter. A pair of adjusting units threadedly engage the stud 53, on opposite sides of the collar 54, enabling vertical adjustment of the post 30*a***.

A spring 39, in tension, braces the brackets 31, 32 together. Pin 56, secured to the plate 33, serves as a limit stop with respect to inward relative motion.

The lead bending finger 38 extends generally vertically upwardly from the center of the upper edge of base 48 and includes a forwardly extending portion **38*a* terminating in a transversely extending edge 38*b* for direct engagement of a lead as 13**.

The anvil 26 includes two rolling recesses 57, into which the lead bending fingers 38 force the end of pre-bent leads 10, 14, so that the lead ends will engage the rolling recesses 57 with an inward bias, assuring a perfect stapling operation.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a device for clinching a staple, said staple including a pair of parallel metallic rods, and wherein is provided a clincher head movable for clinching said rods in stapling relation, a pair of pre-bender elements, means responsive to initial movement in a clinching direction of said clincher head for activating said pre-bender elements to pre-bend said rods toward each other and for thereafter and responsive to continued movement of said clincher head in said clinching direction removing said bender elements from the immediate vicinity of said rods, said means consisting of a single cam secured to and movable with said clincher head and a single pair of opposed cam followers secured to said bender elements and movable each in a predetermined re-entrant path by said single cam during said movement of said clincher head, a spring for biasing said single pair of opposed cam followers toward each other and out of pre-bending relation to said staple, said clincher head being arranged for moving said single cam in a path through and beyond the space between said cam followers and in positive separating relation to said cam followers followed by release of said cam followers in a first continuous motion and reciprocally to said first path thereafter, said cam followers being rollers.

2. A clincher for a stapling machine for staples including parallel leads, said stapling machine including a translatable columnar clinching anvil, a post, a collar secured immovably to said clinching anvil, means for securing said post at one of its ends to said collar, said post extending generally parallel to said columnar clinching anvil, a cam secured adjacent said post at its other end, a two armed bracket having a base plate and parallel arms extending from said base plate on opposite sides of said columnar clinching anvil, each of said arms supporting a pair of pivots, a pair of U-shaped brackets having base and parallel plates, said plates being pivotally secured to said pivots, the bases of said brackets facing said columnar clinching anvil and located on opposite sides thereof, at least one cam follower secured to each of said plates and located to be separated by said cam, spring means biasing said plates toward one another, and opposed lead bending fingers secured to said bases centrally thereof, said cam being responsive to movement in a clinching direction of said clinching anvil to initially separate said cam followers and thereby to actuate said lead bending fingers towards one another into lead bending position and on continued movement in said clinching direction to release said cam followers and thereby actuate said lead bending fingers out of lead bending position.

3. A clincher for a stapling machine for staples including parallel leads, said stapling machine including a translatable columnar clinching anvil, a post, a collar secured immovably to said clinching anvil, screw adjusting means for securing said post at one of its ends to said collar at variable displacements therefrom, said post extending generally parallel to said columnar clinching anvil, a cam secured adjacent said post at its other end, a two armed bracket having a base plate and parallel arms extending from said base plate on opposite sides of said columnar clinching anvil, each of said arms supporting a pair of pivots, a pair of U-shaped brackets having a base and parallel plates, said plates being pivotally secured to said pivots, the bases of said brackets facing said columnar clinching anvil and located on opposite sides thereof, at least one cam follower secured to each of said plates and located to be separated by said cam, spring means biasing said plates toward one another, and opposed lead bending fingers secured to said bases centrally thereof, said cam being responsive to movement in a clinching direction of said clinching anvil to initially separate said cam followers and thereby to actuate said lead bending fingers towards one another into lead bending position, and on continued movement in said clinching direction to release said cam followers and thereby actuate said lead bending fingers out of lead bending position.

References Cited in the file of this patent

UNITED STATES PATENTS

| | | |
|---|---|---|
| 263,390 | Coop | Aug. 29, 1882 |
| 412,712 | Lynam | Oct. 8, 1889 |
| 832,681 | Lind | Oct. 9, 1906 |
| 1,060,168 | Crombie | Apr. 29, 1913 |
| 1,704,517 | Russell | Mar. 5, 1929 |